United States Patent [19]

Leiweke et al.

[11] Patent Number: 5,058,728
[45] Date of Patent: Oct. 22, 1991

[54] CLEANING APPARATUS FOR WRAPPING MACHINE CONVEYOR

[75] Inventors: Michael E. Leiweke, Arnold; Jon H. Holler, St. Louis, both of Mo.

[73] Assignee: Continental Baking Company, St. Louis, Mo.

[21] Appl. No.: 387,214

[22] Filed: Jul. 28, 1989

[51] Int. Cl.$^5$ ............................................. B65G 45/00
[52] U.S. Cl. .................................. 198/495; 15/256.52; 198/496
[58] Field of Search ............... 198/495, 496, 497, 498; 15/256.5, 256.52, 256.6, 77; 53/450

[56] References Cited

U.S. PATENT DOCUMENTS

| | | | |
|---|---|---|---|
| 2,083,864 | 6/1937 | Puckett | 198/496 |
| 4,034,433 | 7/1977 | Slingsby | 15/77 |
| 4,730,360 | 3/1988 | Brügelmann | 15/77 |
| 4,854,443 | 8/1989 | Gordon | 15/256.5 X |
| 4,960,200 | 12/1990 | Pierce | 198/496 X |

Primary Examiner—Joseph E. Valenza
Assistant Examiner—Keith L. Dixon
Attorney, Agent, or Firm—Virgil B. Hill

[57] ABSTRACT

A cleaning apparatus for a conveyor chain of a wrapping machine includes a frame, a pan supported on the frame, a cleaning brush assembly, and a fluid removal assembly. The pan is adapted to contain a cleaning fluid such as water. The brush assembly includes a driven, rotary brush which scrub the conveyor chain with the cleaning fluid. The fluid removal assembly includes a plurality of squeegee blades which engage the chain and wipe the fluid therefrom. In addition, a plurality of air nozzles are positioned to blast the chain with pressurized air.

13 Claims, 6 Drawing Sheets

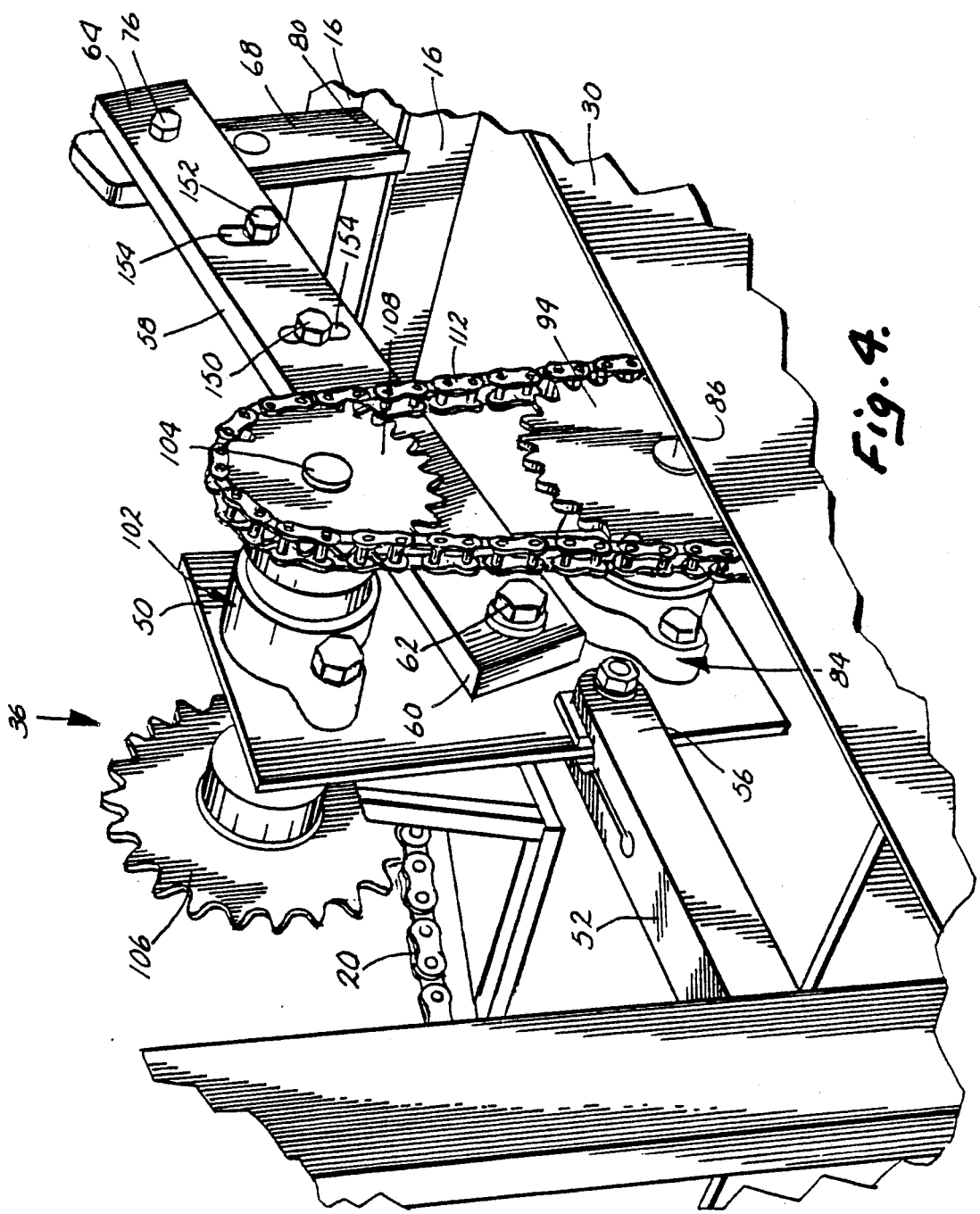

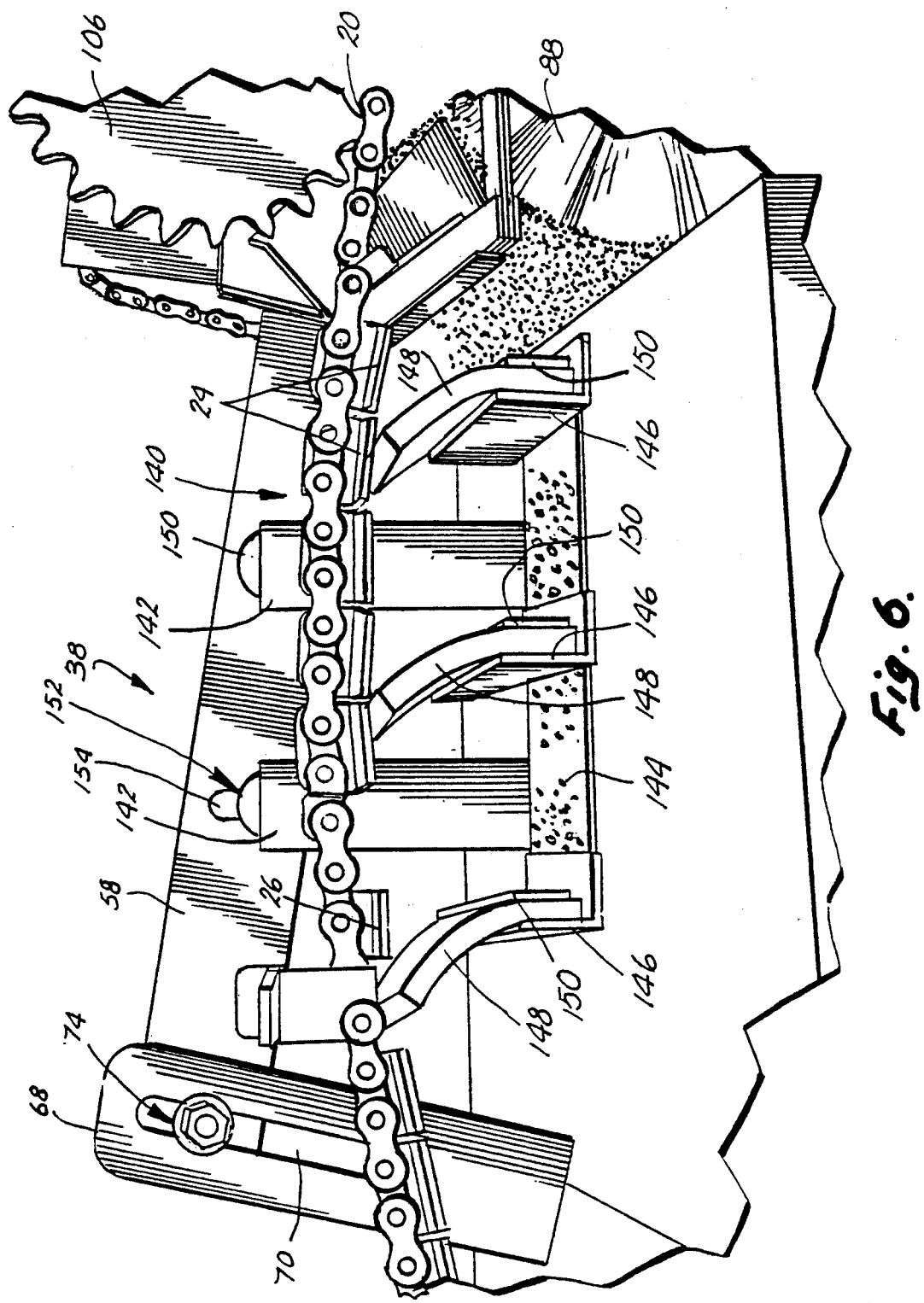

CLEANING APPARATUS FOR WRAPPING MACHINE CONVEYOR

BACKGROUND OF THE INVENTION

The present invention relates to product wrapping machines and more particularly to a cleaning apparatus or washer for a wrapping machine used principally in the food product area.

A wide variety of snack products are presently being mass produced. These products include cake or baked goods having frosting coatings, cream fillings, fruit and jam fillings, coconut sprinkles and alike. The products are typically wrapped in individual packages, boxed and shipped for resale.

A presently known machine wraps individual products in packages formed from a continuous film of packaging material. Such a machine includes an infeed conveyor having a continuous, roller chain to which a plurality of individual flights and retractable lugs are secured. The product may be placed directly on the conveyor flights and transported into the packaging portion of the machine. In the alternative, individual paper cards may be positioned between the product and the conveyor chain. Examples of such wrapping machines may be found in U.S. Pat. No. 4,506,488 entitled Wrapping Machine and Method and issued on Mar. 26, 1985 to Matt et al, U.S. Pat. No. 4,525,977 entitled Wrapping Machine and Method and issued on July 2, 1985 to Matt et al, and U.S. Pat. No. 4,574,566 entitled Wrapping Machine and Method and issued on Mar. 11, 1986 to Eaves et al.

The conveyor chain may become covered with the product filling and/or the product coatings. Build-up on the chain may cause machine shutdown. Such build-up can result in breakage of the individual flights on the conveyor chain. Production rates are reduced due to the need to clean and dry the conveyor.

A need exists, therefore, for a device or apparatus which will effectively and efficiently clean a chain conveyor of a wrapping machine without reducing production rates.

SUMMARY OF THE INVENTION

In accordance with the present invention, the aforementioned need is fulfilled. Essentially, an apparatus is provided which includes a pan or reservoir for a fluid and a brush subassembly to clean the conveyor during packaging operations. In narrower aspects of the invention, provision is made for drying the conveyor after it is engaged by the brush. A plurality of squeegee blades and air nozzles dry the chain.

BRIEF DESCRIPTION OF THE DRAWINGS

FIG. 2a is schematic of an air nozzle subassembly;

FIG. 4 is a fragmentary, enlarged, rear perspective view showing the brush drive incorporated in the present invention;

FIG. 6 is an enlarged, elevational view of the squeegee subassembly;

DETAILED DESCRIPTION OF THE PREFERRED EMBODIMENT

Figure 1:
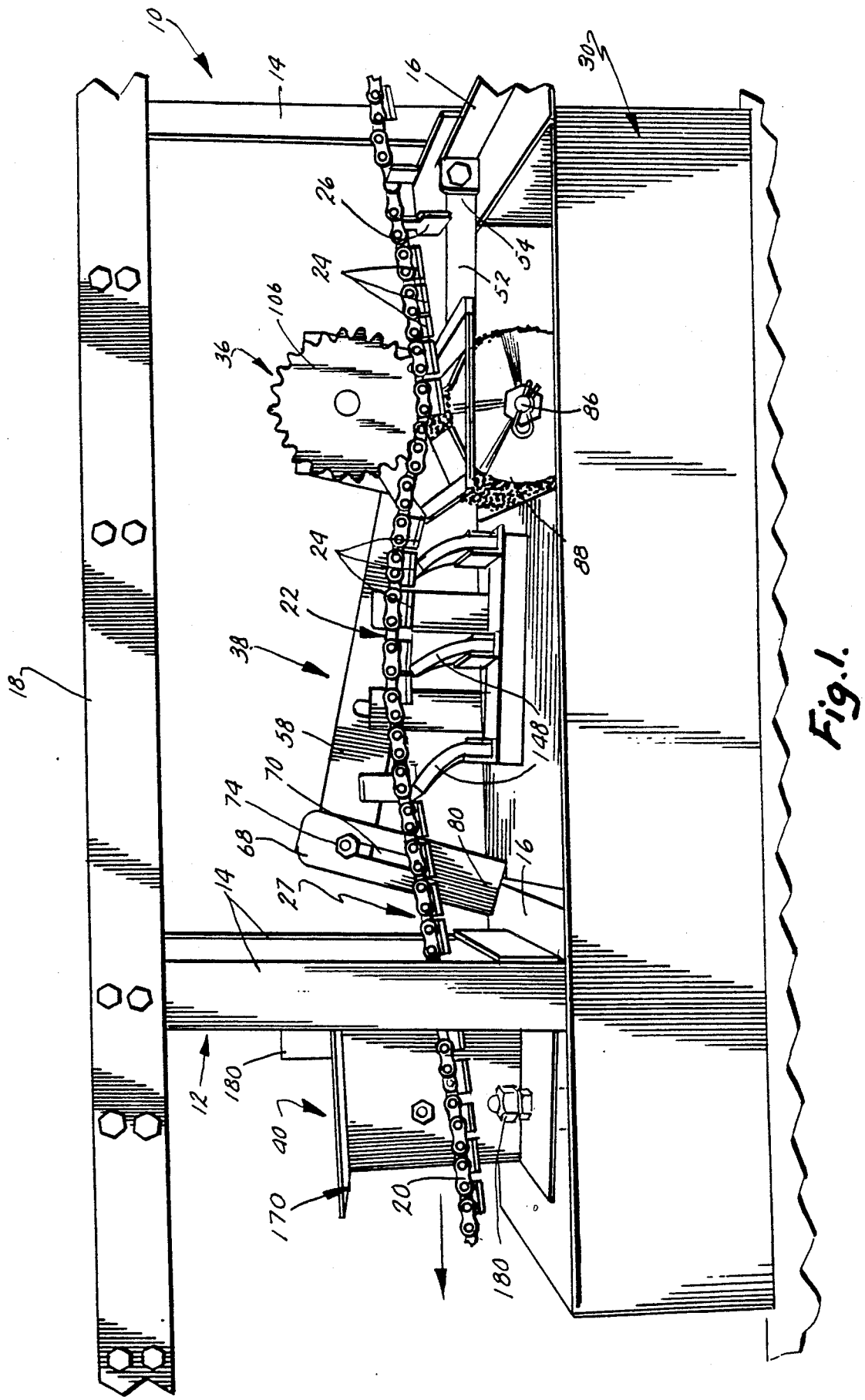
FIG. 1 is a front, elevational view of a cleaning apparatus in accordance with the present invention.
Figure 2:
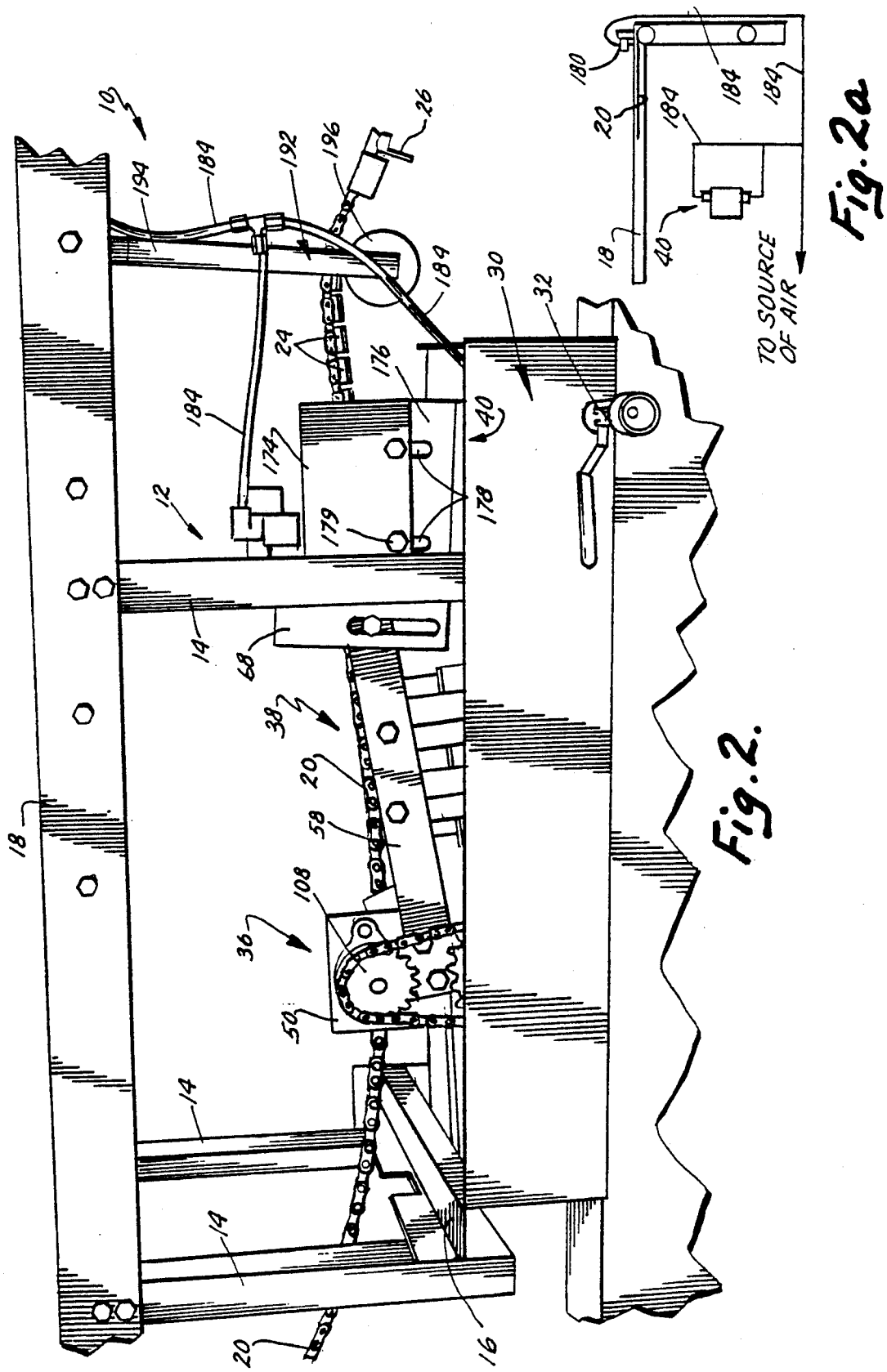
FIG. 2 is a rear, elevational view of the cleaning apparatus mounted on a packaging machine.

A cleaning apparatus or chain washer in accordance with the present invention is illustrated in FIGS. 1 and 2 and generally designated by the numeral 10. Apparatus 10 includes a frame 12. Frame 12 includes vertical uprights 14 and cross supports 16. Uprights 14 are bolted or otherwise suitably secured to side rails 18 of a wrapping machine. The wrapping machine includes a conveyor chain 20. A lower run of the conveyor chain is illustrated in FIGS. 1 and 2. As is known, the conveyor chain transports product to be packaged or wrapped into the machine. The cleaning apparatus 10 in accordance with the present invention is mounted on the wrapping machine so that it will wash or clean the return or lower run of chain 20 during packaging operations.

Mounted on chain 20 at spaced positions and in tandem relationship are a plurality of flights 22. Flights 22 include individual tabs or product support plates 24 and retractable lugs 26. The flights may become covered with sticky fillings and the like. Apparatus 10 efficiently washes and cleans such materials from chain 20.

An elongated pan or cleaning fluid reservoir 30 is mounted on frame 12. As seen in FIG. 2, a drain valve 32 is mounted on a side panel of pan 30. The pan contains a cleaning or washing fluid such as water.

A brush subassembly 36, a squeegee subassembly 38 and an air nozzle subassembly 40 are supported on frame 12 above pan 30. Brush subassembly 36 scrubs the chain with the cleaning fluid. The squeege subassembly 38 and the air nozzle subassembly 40 remove the fluid from the chain and dry the chain prior to its return to the infeed run.

Figure 3:
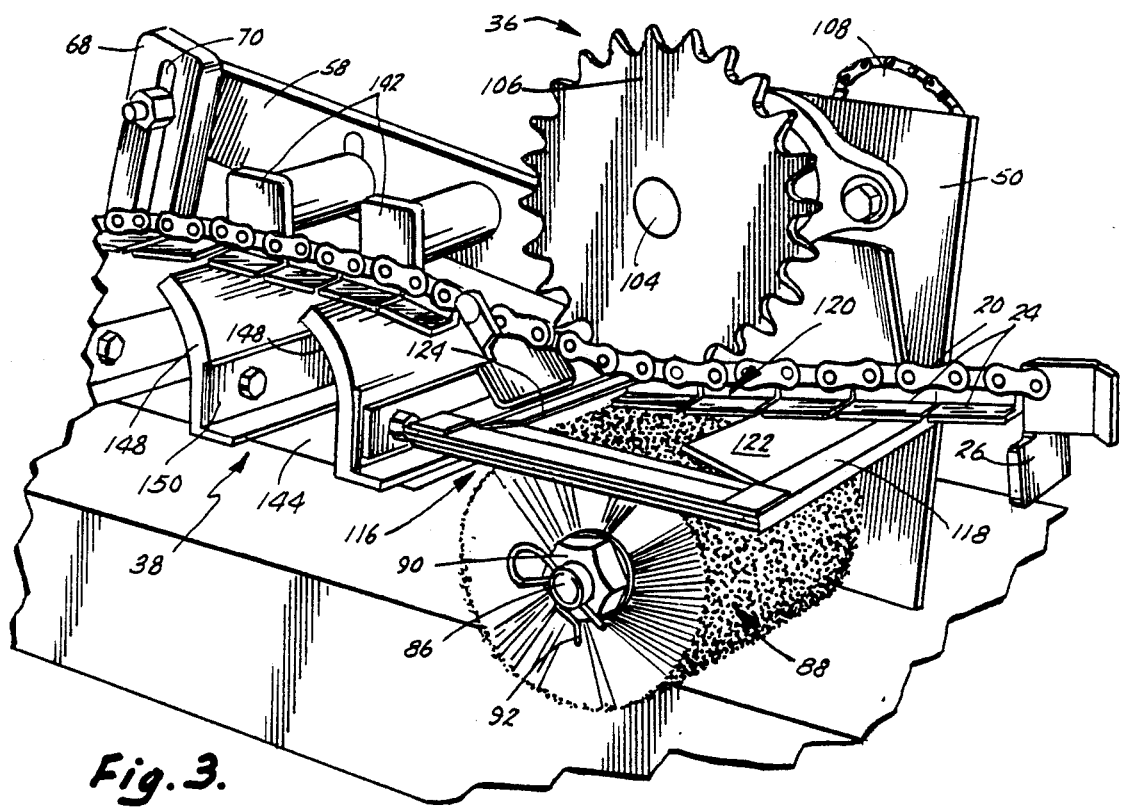
FIG. 3 is a fragmentary, perspective view of brush squeegee subassemblies incorporated in the present invention.
Figure 5:
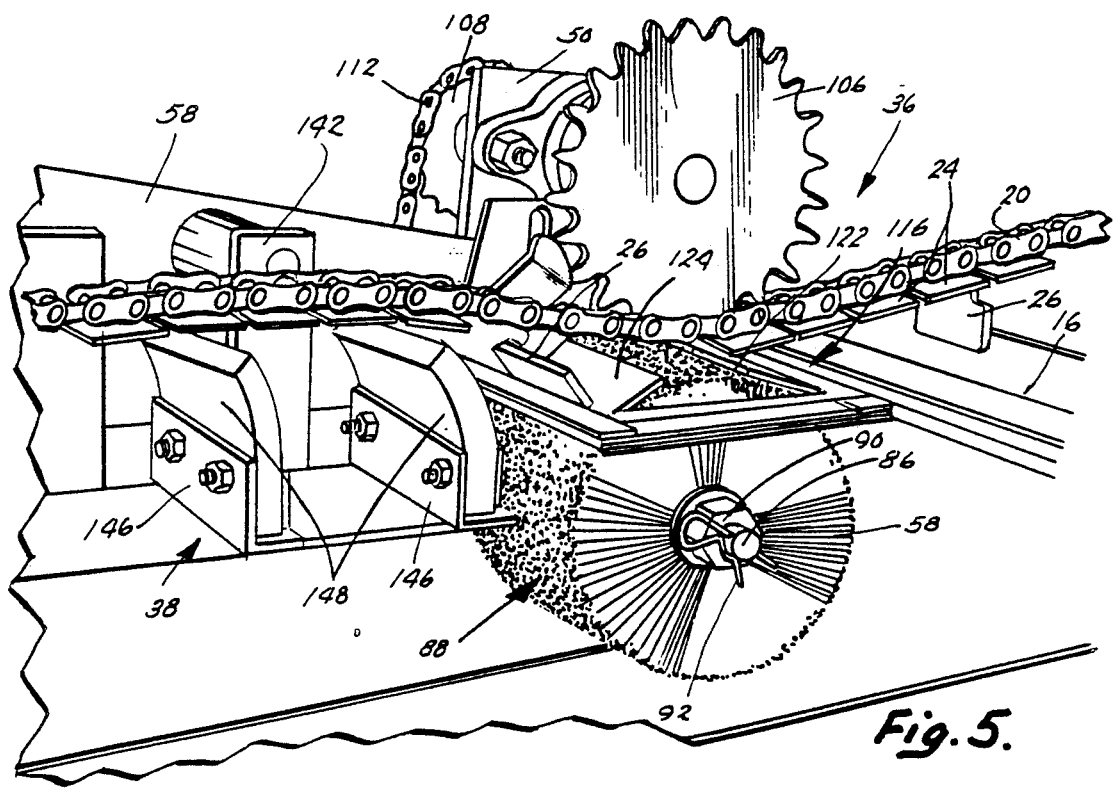
FIG. 5 is a front, perspective view of the brush and squeegee subassemblies.

As best seen in FIGS. 3, 4 and 5, brush subassembly 36 includes a mounting or bearing plate 50. A support link 52 has an end 54 pivoted to a frame member 16 (FIG. 1). End 56 of link 52 is pivotally secured to plate 50. A support or connecting arm 58 has an end 60 pivoted to plate 50 by a suitable fastener 62. An end 64 of arm 58 is pivotally joined to an angular adjustment arm 68. Arm 68 (FIG. 1) defines an elongated slot 70. A fastener including a nut and bolt 74, 76 positions end 64 of arm 58 within slot 70. A lower end 80 of arm 68 rests on a crossmember 16 of frame 12.

Plate 50 supports a lower bearing subassembly 84. A brush shaft 86 is rotatably mounted in bearing subassembly 84. A rotary brush 88 is retained on shaft 86 by nut 90 and cotter pin 92. A sprocket 94 is secured to brush shaft 86 at an end opposite brush 88 (FIG. 4).

Plate 50 also supports an upper bearing assembly 102. Assembly 102 rotatably mounts a drive shaft 104. One end of the drive shaft 104 has a drive sprocket 106 secured thereto. An output sprocket 108 is secured to the opposite end of shaft 104. As shown in the drawings, drive sprocket 106 is engaged by roller chain 20 of the wrapping machine. Brush sprocket 94 is connected to output sprocket 108 by a drive chain 112. As a result, rotation of sprocket 106 by movement of the chain 20 through the cleaning apparatus rotatably drives cleaning brush 88. The brush may be positioned relative to the chain by suitable positioning of arm 58 and arm 68.

A fender subassembly 116 is mounted on plate 50. Fender 116 includes a rectangular frame 118 which supports a rubber skirt 120 having flap portions 122, 124. Flaps 122, 124 rest on the peripheral surface of brush 88. Fender subassembly 116 defines a limited aperture or opening through which the bristles of the brush 88 engage the conveyor chain 20. The skirt confines the cleaning fluid and reduces splashing.

As seen in FIGS. 3-6, squeegee subassembly 38 includes a bracket structure 140 having a pair of uprights 142 which support a plate 144. Joined to plate 144 are right angle members 146. A plurality of individual neoprene or vinyl squeegee blades 148 are secured to angle members 146 by clamp plates 150. Uprights 142 are adjustably mounted on support or connecting arm 58 by suitable fasteners 150, 152 (FIG. 4). Fastener 152 (FIG. 4) extends through a vertical slot 154 formed in arm 58. Vertical and angular adjustment of the squeegee subassembly is, therefore, provided.

Figure 7:
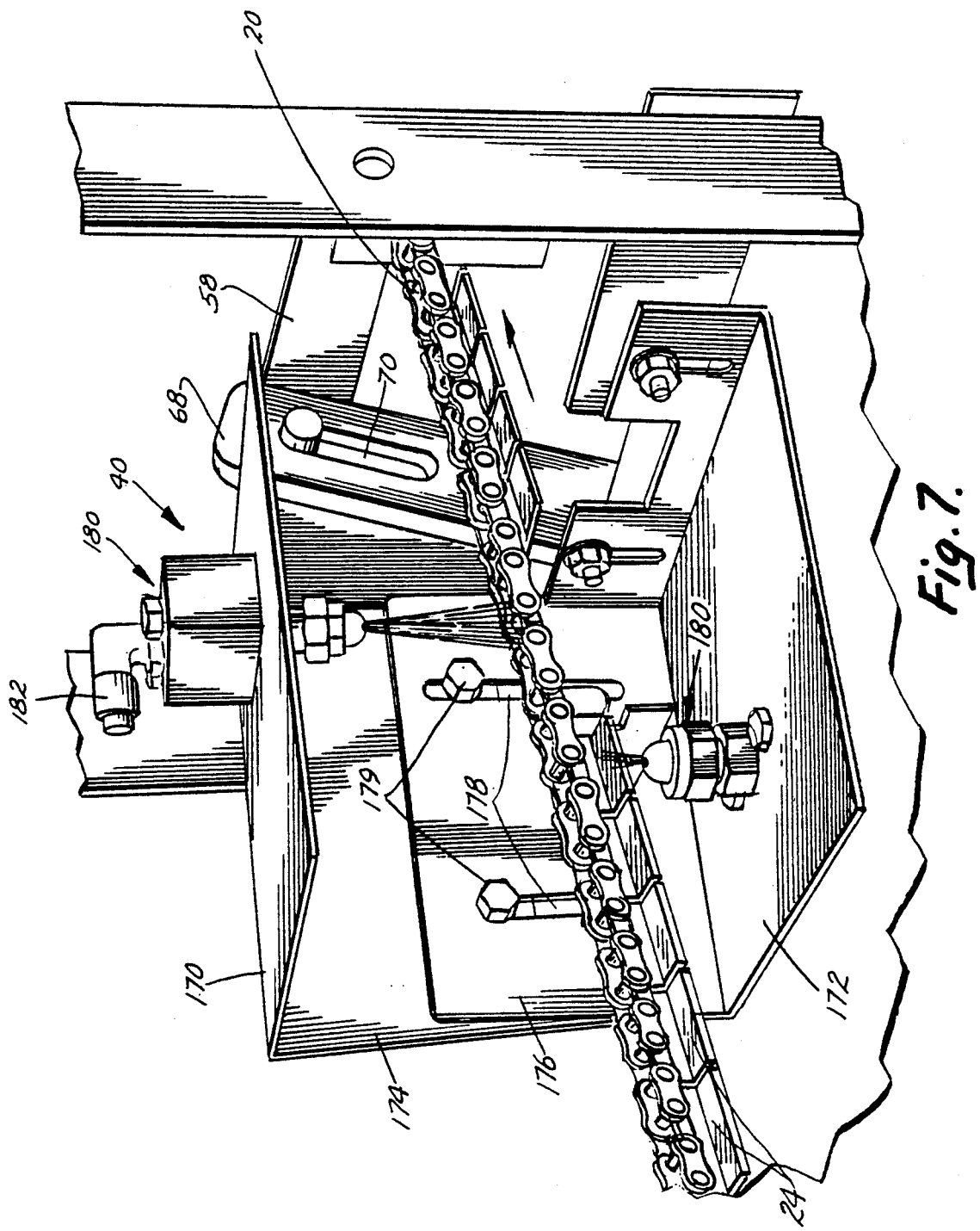
FIG. 7 is an enlarged, perspective view of a portion of the air nozzle subassembly included in the present invention.

The air nozzle subassembly 40, as seen in FIGS. 2 and 7, includes a shroud defined by L-shaped members 170, 172. Members 170, 172 include vertical portions 174, 176. Portion 176 of member 172 defines slots 178. Members 170, 172 are interconnected by fasteners 179 passing through slots 178. The vertical height or distance between members 170, 172 is, therefore, adjustable. Air nozzles 180 are supported on members 170, 172. Nozzles 180 include fittings 182 connected by suitable tubing 184 to a source of pressurized air (FIG. 2a). Nozzles 180 are positioned within the shroud to blast the chain 20 with pressurized air. The air completes the cleaning process by removing any excess water or fluid and drying the chain. In addition, an upper air nozzle 180 may be on the wrapping machine where chain 20 returns to a top surface. The additional air nozzle insures that the conveyor chain is properly dried. Suitable shields (not shown) may be positioned on each side of the cleaning apparatus to limit splashing or spraying and contain the fluid within the reservoir 30.

OPERATION

Once a suitable location is selected, frame 12 is secured to side members 18 of the wrapping machine. Pan 30 is positioned on the frame. If necessary, a roller subassembly 192 (FIG. 2) including a frame 194 and roller 196, is mounted on side members 18 of the wrapping machine to lift and properly position chain 20. The individual elements of the chain washer are adjusted so that sprocket 106 of the brush assembly engages the conveyor chain 20. The various fasteners may then be tightened. Support arm 58 and the squeegee subassembly are properly positioned to engage the chain surface. In certain operations, the cleaning apparatus may be run without the squeegee assembly, depending on the product being packaged. The apparatus should be positioned, therefore, so that the wrapping machine chain 20 will exit the apparatus without contacting the washer pan 30 or the bottom shroud portion of the air nozzle subassembly 40.

Once in position, the pan is filled to a level where the water is just in contact with brush 58. This prevents or minimizes splashing and also minimizes the amount of water on the chain while assuring adequate cleaning. As conveyor 20 is operated, brush 88 automatically scrubs the chain through the opening defined by the fender subassembly. The lugs, support plates and flights of the chain are wiped by the squeegee subassembly. The air nozzles then blast and remove any remaining air insuring that the chain is dry prior to returning to the packaging portion of the machine.

The chain cleaning apparatus or washer in accordance with the present invention requires no outside power source for its operation. Effective chain cleaning is obtained while minimizing over spray, splashing and the like. The apparatus is reliable in us having a minimum of moveable parts. Adjustability is built in to accommodate different packaging machine and mounting positions. The conveyor is cleaned without stopping the wrapping machine. Production rates are maintained.

In view of the foregoing description those of ordinary skill in the art may envision various modifications which would not depart from the inventive of concepts disclosed herein. The above description should, therefore, be considered as only that of the preferred embodiment. The true spirit and scope of the present invention may be determined by reference to the appended claims.

The embodiments of the invention in which an exclusive property or privilege is claimed are defined as follows:

1. A conveyor chain cleaning apparatus adapted for use on a food wrapping machine, said apparatus comprising:
   a frame;
   a pan supported on said frame, said pan adapted to contain a cleaning fluid;
   brush means on said frame for brushing a conveyor chain, said brush means including a fender subassembly including a frame and a pair of flexible flaps on said frame, said flaps resting on said brush and defining an aperture through which a portion of said brush extends;
   fluid removal means on said frame for removing cleaning fluid from said chain after the chain is engaged by said brush means, said fluid removal means including squeegee means on said frame for wiping cleaning fluid from the conveyor chain; and
   drive means operatively connected to said brush and the chain for rotating said brush as the chain passes over said brush.

2. A conveyor chain cleaning apparatus as defined by claim 1 wherein said brush means comprises:
   a mounting plate;
   a brush axle secured to said mounting plate 9; and
   a brush mounted on said axle.

3. A conveyor chain cleaning apparatus adapted for use on a food wrapping machine, said apparatus comprising:
   a frame;
   a pan supported on said frame, said pan adapted to contain a cleaning fluid;
   brush means on said frame for brushing a conveyor chain; and
   fluid removal means on said frame for removing cleaning fluid from said chain after the chain is engaged by said brush means, said brush means comprising:
   a mounting plate;
   a brush axle secured to said mounting plate; and a brush mounted on said axle; and
   drive means operatively connected to said brush for rotating said brush as the chain passes over said brush, and wherein said drive means comprises:
   a drive axle rotatably mounted on said mounting plate;

a conveyor chain sprocket fixed to said drive axle and positioned to be engaged by said conveyor chain;

an output sprocket fixed to said drive axle;

a driven sprocket fixed to said brush axle; and a drive chain interconnecting said output sprocket and said driven sprocket.

4. A conveyor chain cleaning apparatus as defined by claim 2 wherein said brush means further comprises:

an arm, said mounting plate being fixed to an end of said arm; and adjustable support means on said frame for adjustably supporting said arm on said frame.

5. A conveyor chain cleaning apparatus as defined by claim 3 wherein said brush means further comprises:

an arm, said mounting plate being fixed to an end of said arm; and adjustable support means on said frame for adjustably supporting said arm on said frame.

6. A conveyor chain cleaning apparatus as defined by claim 1 wherein said squeegee means comprises:

a support bracket; and a plurality of flexible squeegee blades mounted on said support bracket.

7. A conveyor chain cleaning apparatus as defined by claim 1 wherein said fluid removal means comprises:

an air nozzle mounted on said frame; and a shroud covering said air nozzle.

8. A conveyor chain cleaning apparatus as defined by claim 7 wherein said fluid removal means further comprises:

a source of pressurized air connected to said air nozzle.

9. An apparatus for cleaning a conveyor, said apparatus comprising:

a frame;

a mount;

support means for adjustably supporting said mount on said frame;

a brush axle supported on said mount;

a brush positioned on said brush axle; and drive means on said mount for rotating said brush, and wherein said drive means comprises:

a drive axle mounted on said mount;

a driven member fixed to said drive axle and adapted to be driven by the conveyor; and means interconnecting said driven member and said brush, said means interconnecting said driven member and said brush including:

an output sprocket on said drive axle;

a brush sprocket on said brush axle; and a chain interconnecting said output and brush sprockets.

10. An apparatus as defined by claim 9 further including a pan defining a liquid reservoir, said brush extending into said reservoir.

11. An apparatus as defined by claim 9 further comprising:

squeegee means on said frame for wiping the conveyor.

12. An apparatus as defined by claim 11 further comprising:

air nozzle means on said frame for blowing air on the conveyor.

13. An apparatus as defined by claim 11 wherein said squeegee means includes a plurality of flexible blades and a bracket supporting said blades.

* * * * *